(12) United States Patent
Kong

(10) Patent No.: US 11,409,960 B2
(45) Date of Patent: Aug. 9, 2022

(54) SUMMARY GENERATION METHOD, APPARATUS, COMPUTER DEVICE, AND STORAGE MEDIUM

(71) Applicant: Tencent Technology (Shenzhen) Company Limited, Guangdong (CN)

(72) Inventor: Hang Kong, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 469 days.

(21) Appl. No.: 16/545,904

(22) Filed: Aug. 20, 2019

(65) Prior Publication Data

US 2019/0370338 A1 Dec. 5, 2019

Related U.S. Application Data

(63) Continuation of application No. PCT/CN2018/092078, filed on Jun. 21, 2018.

(30) Foreign Application Priority Data

Jun. 22, 2017 (CN) .......................... 201710481703.4

(51) Int. Cl.
G06F 40/30 (2020.01)
G06N 3/08 (2006.01)
G06N 7/00 (2006.01)

(52) U.S. Cl.
CPC ............. *G06F 40/30* (2020.01); *G06N 3/084* (2013.01); *G06N 7/005* (2013.01)

(58) Field of Classification Search
None
See application file for complete search history.

(56) References Cited

U.S. PATENT DOCUMENTS 8,108,398 B2 * 1/2012 Guday ................. G06F 16/345
707/738
2002/0138528 A1 * 9/2002 Gong ..................... G06Q 40/08
715/255

(Continued)

FOREIGN PATENT DOCUMENTS

CN 101751425 A 6/2010
CN 103136359 A 4/2015

(Continued)

OTHER PUBLICATIONS

International Search Report for corresponding International Patent Application PCT/CN2018/092078, dated Sep. 6, 2018.

(Continued)

*Primary Examiner* — Nafiz E Hoque
(74) *Attorney, Agent, or Firm* — Crowell & Moring LLP

(57) ABSTRACT

This application discloses a summary generation using natural language processing via method, apparatus, and a computer device. The summary generation is implemented by obtaining a document, the document including at least one sentence. The summary generation is further implemented by extracting m candidate sentences from the document by using an extractive model. The summary generation is further implemented by outputting target words according to the m candidate sentences by using an abstractive model, and generating a summary according to the target words.

17 Claims, 8 Drawing Sheets

(56) References Cited

U.S. PATENT DOCUMENTS

| | | | |
|---|---|---|---|
| 2014/0229159 A1* | 8/2014 | Branton | G06F 16/345 704/9 |
| 2016/0267165 A1 | 9/2016 | Wang | |

FOREIGN PATENT DOCUMENTS

| | | |
|---|---|---|
| CN | 104503958 A | 4/2015 |
| CN | 105488021 A | 4/2016 |
| CN | 106502985 A | 3/2017 |
| CN | 108280112 A | 7/2017 |
| JP | 2015-225412 A | 12/2015 |

OTHER PUBLICATIONS

Rush, Alexander M. et al., "A Neural Attention Model for Sentence Summarization," Proceedings of the 2015 Conference on Empirical Methods in Natural Language Processing, Sep. 17-21, 2015, 11 pages.

Lin, Jing, "On Extractive Summarization Via Hybrid Neural Networks," School of Computer Science and Engineering, Journal of Huaihua University, vol. 36, No. 5, dated May 31, 2017, 5 pages.

International Search Report and Written Opinion dated Sep. 6, 2018 for PCT Application No. PCT/CN2018/092078, 18 pages.

Office Action dated Feb. 25, 2020 for Chinese Application No. 201710481703.4 with concise English Translation, 17 pages.

Zhang Longkai, et al., "Research on Sentence Extraction Methods in Text Summarization" The 11th Chinese National Conference on Computational Linguistics, CNCCL 2011 with English Abstract.

Vipul Dalal, et al., "A Survey of Extractive and Abstractive Text Summarization Techniques," 2013 6th International Conference on Emerging Trends in Engineering and Technology, (2013). Abstract Only.

Office Action dated Jan. 5, 2021 for Chinese Application No. 201710481703.4 with English machine translation, 10 pages.

* cited by examiner

SUMMARY GENERATION METHOD, APPARATUS, COMPUTER DEVICE, AND STORAGE MEDIUM

RELATED APPLICATION

This application claims priority to Patent Cooperation Treaty International Application No. PCT/CN2018/092078 filed Jun. 21, 2018, which claims priority to Chinese Patent Application No. 201710481703.4, filed with the Chinese Patent Office on Jun. 22, 2017, and entitled "SUMMARY GENERATION METHOD AND APPARATUS, AND COMPUTER DEVICE", each of which being incorporated herein by reference in its entirety.

FIELD OF THE TECHNOLOGY

This application relates to the field of natural language processing, and in particular, to summary generation.

BACKGROUND OF THE DISCLOSURE

Automatic text summarization is used for refining a document, to generate a simple and fluent summary that includes the main idea of the article. Automatic text summarization is a big issue to be solved in the natural language processing field.

In a related technology, an automatic text summarization technology based on an abstractive model is provided. The abstractive model is used for extracting words from each sentence in a document, and then re-combining the extracted words into sentences, to form a summary.

SUMMARY

An embodiment provides a summary generation method. The method includes obtaining a document, the document including at least one sentence. The method further includes extracting m candidate sentences from the document by using an extractive model. The method further includes outputting target words according to the m candidate sentences by using an abstractive model, and generating a summary according to the target words.

An embodiment provides a summary generation apparatus. The apparatus includes a memory and a processor, the memory storing a computer-readable instruction, and the processor executing the computer-readable instruction in the memory, to perform steps. The steps include obtaining a document, the document including at least one sentence, and each sentence including at least one word. The steps further include extracting m candidate sentences from the document by using an extractive model. The steps further include outputting target words according to the m candidate sentences by using an abstractive model, and generating a summary according to the target words.

In some embodiments, the processor is further configured to execute the computer-readable instruction, to perform further steps. The steps further include calculating a sentence-level encoding vector of each sentence in the document. The steps further include calculating a document-level encoding vector of the document according to the sentence-level encoding vector of each sentence. The steps further include calculating a probability P of each sentence in the document according to the sentence-level encoding vector and the document-level encoding vector, and extracting sentences whose probabilities P are greater than a preset threshold in the document as the m candidate sentences, wherein a value of the probability P of each sentence is 1 or 0.

In some embodiments, the processor is further configured to execute the computer-readable instruction, to perform further steps. The steps further include inputting each word in the sentence to a first bidirectional recurrent neural network in a forward propagation direction, to obtain a first forward encoding vector. The steps further include inputting each word in the sentence to the first bidirectional recurrent neural network in a backward propagation direction, to obtain a first backward encoding vector. The steps further include obtaining the sentence-level encoding vector of the sentence according to the first forward encoding vectors and the first backward encoding vectors.

In some embodiments, the processor is further configured to execute the computer-readable instruction, to perform further steps. The steps further include inputting sentence-level encoding vectors of n sentences to a second bidirectional recurrent neural network in a forward propagation direction, to obtain second forward encoding vectors, where n is a quantity of sentences in the document. The steps further include inputting sentence-level encoding vectors of the n sentences to the second bidirectional recurrent neural network in a backward propagation direction, to obtain second backward encoding vectors, where n is a quantity of sentences in the document. The steps further include obtaining the document-level encoding vector of the document according to the second forward encoding vectors and the second backward encoding vectors.

In some embodiments, the processor is further configured to execute the computer-readable instruction, to perform further steps. The steps further include inputting sentence-level encoding vectors of the m candidate sentences as an input sequence to the abstractive model, and calculating an output probability at an $i^{th}$ decoding moment, where i is a positive integer. The steps further include when the output probability is greater than the preset threshold, generating, as an $i^{th}$ word in the summary, a word from a vocabulary that corresponds to the document, where the vocabulary includes words whose occurrence frequencies are higher than a preset criterion in the document. Additionally or alternatively, the steps further include when the output probability is less than the preset threshold, extracting a target word from a target sentence in the m candidate sentences, and using the target word as an $i^{th}$ word in the summary.

In some embodiments, the processor is further configured to execute the computer-readable instruction, to perform further steps. The steps further include calculating a context vector $c_i$ at the $i^{th}$ decoding moment according to the sentence-level encoding vectors of the m candidate sentences by using the encoder. The steps further include inputting an implicit state at an (i−1)th decoding moment, the context vector $c_i$, and an $(i-1)^{th}$ word in the summary to the decoder, and calculating an implicit state at the $i^{th}$ decoding moment, where the implicit state at the $i^{th}$ decoding moment is used for indicating a part of the input sequence that is already processed by the decoder at the $i^{th}$ decoding moment. The steps further include calculating the output probability at the $i^{th}$ decoding moment according to the $(i-1)^{th}$ word in the summary, the context vector $c_i$, and the implicit state at the $i^{th}$ decoding moment, where i is a positive integer, and when i−1=0, the implicit state at the $(i-1)^{th}$ decoding moment takes a default value, and the $(i-1)^{th}$ word takes a default value.

In some embodiments, the processor is further configured to execute the computer-readable instruction, to perform further steps. The steps further include determining, from the m candidate sentences, a target sentence that is at the $i^{th}$ decoding moment by using the first maximum-likelihood estimation function. The steps further include determining a target word from words in the target sentence by using the second maximum-likelihood estimation function.

Various embodiments provide a computer device. The computer device includes a processor and a memory. The memory stores at least one instruction, at least one program, a code set, or an instruction set. The at least one instruction, the at least one program, the code set, or the instruction set is loaded and executed by the processor to perform the summary generation method as described herein.

Various embodiments provide a computer-readable storage medium. The computer-readable storage medium stores at least one instruction, at least one program, a code set, or an instruction set. The at least one instruction, the at least one program, the code set, or the instruction set is loaded and executed by a processor to perform the summary generation method as described herein.

BRIEF DESCRIPTION OF THE DRAWINGS

To describe the technical solutions in the embodiments more clearly, the following briefly describes the accompanying drawings required for describing the embodiments. The accompanying drawings in the following description show some embodiments of this application, and a person of ordinary skill in the art may still derive other embodiments without departing from the disclosure herein.

DESCRIPTION OF EMBODIMENTS

To clarify the objectives, technical solutions, and advantages, the following further describes, in detail, implementations with reference to the accompanying drawings.

Figure 1:
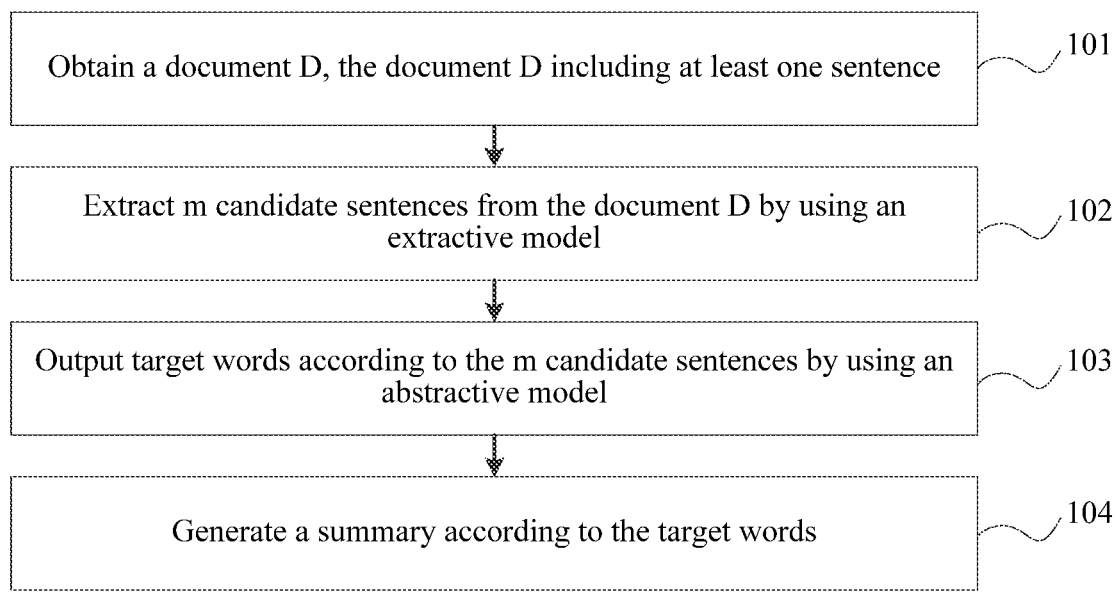
FIG. 1 is a flowchart of a summary generation method according to an example embodiment.

FIG. 1 is a flowchart of a summary generation method according to an example embodiment. The summary generation method is performed by a computer device, and includes the following steps. In step 101, a document D is obtained, the document D including at least one sentence. In step 102, m candidate sentences are extracted from the document D by using an extractive model.

Optionally, the extractive model includes an attention-based model.

The attention-based model is used for calculating a probability value of each sentence in the document D, extracting sentences whose probability values are greater than a preset threshold as a candidate sentence, and discarding sentences whose probabilities are less than the preset threshold. The extractive model is used for extracting m candidate sentences suitable for constituting a summary from the document D.

In step 103, target words are output according to the m candidate sentences by using an abstractive model, and a summary is generated according to the target words.

Optionally, the abstractive model includes a model based on a pointer-generator network, and the abstractive model includes an encoder and a decoder. The encoder corresponds to an encoding moment, and the decoder corresponds to a decoding moment.

An output probability at each decoding moment is calculated by using the abstractive model, and the output probability is compared with the preset threshold. If the output probability is greater than the preset threshold, the output probability is marked as 1, and a word is generated from a vocabulary corresponding to the document D for output; if the output probability is less than the preset threshold, the output probability is marked as 0, and the target words are extracted from the m candidate sentences for output. Optionally, the vocabulary includes the top s most frequently occurring words in the document D, where s is a positive integer.

In step 104, the summary is generated according to the target words.

In this and some other embodiments, the m candidate sentences suitable for constituting the summary are first extracted from the document by using the extractive model, to reduce a length of a sequence of text needing to be processed by the abstractive model. Then, the target words are generated or extracted according to the candidate sentences by using the abstractive model, and the summary of the document D are combined according to the target words. Therefore, readability and an amount of information of the finally generated summary are increased.

Figure 2A:
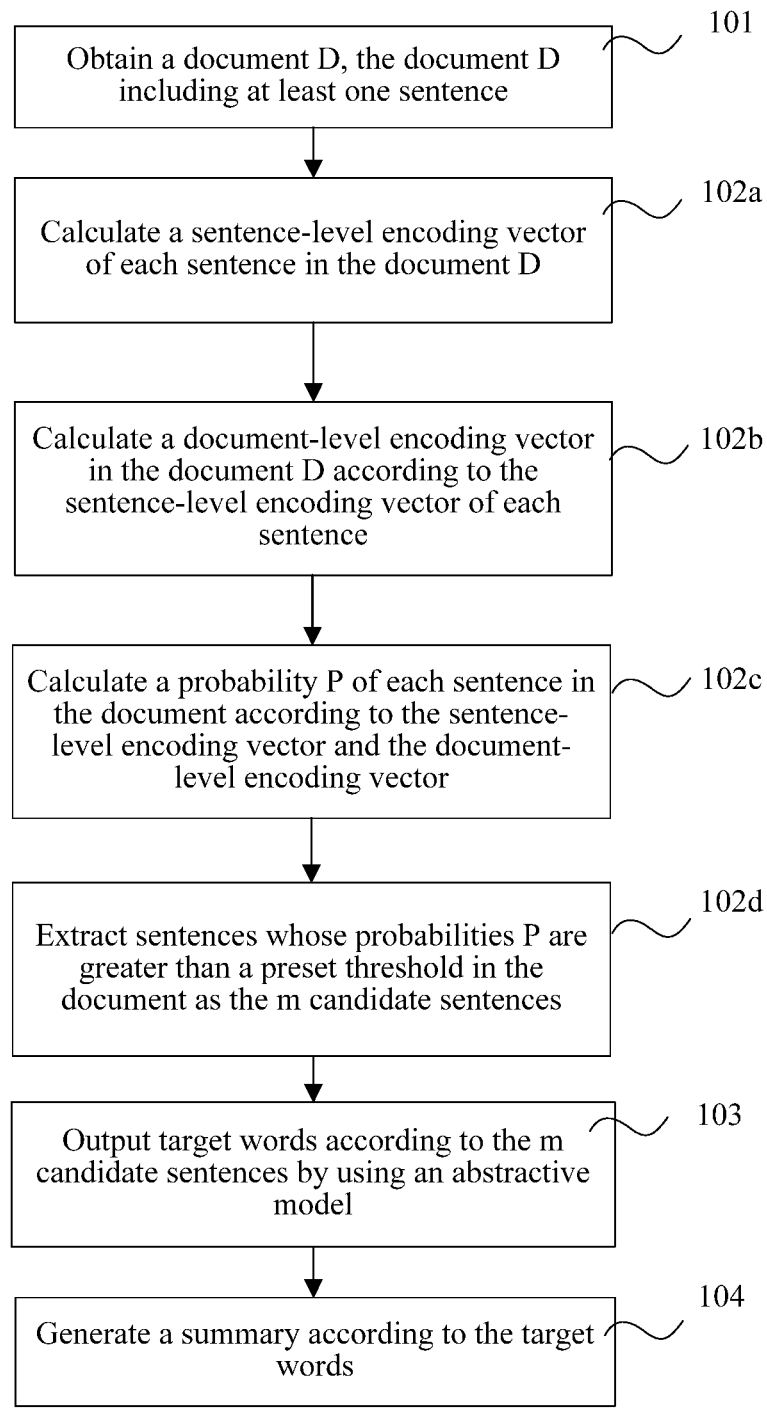
FIG. 2a to FIG. 2c are flowcharts of a summary generation method according to another example embodiment.

In some embodiments, the extractive model is an attention-based model. In the extractive model, each sentence in the document D is encoded by using a bidirectional recurrent neural network, to obtain the sentence-level encoding vector of each sentence. Then, m candidate sentences suitable for constituting the summary are extracted from the document D according to the sentence-level encoding vector of each sentence. Based on a flowchart of the summary generation method shown by FIG. 1, step 102 may be alternatively implemented as step 102a to step 102d, as shown in FIG. 2a.

In step 102a, a sentence-level encoding vector of each sentence in the document D is calculated.

Optionally, the sentence-level encoding vector may be calculated using a bidirectional recurrent neural network or a unidirectional recurrent neural network. However, other calculation platforms may be used.

Figure 2B:
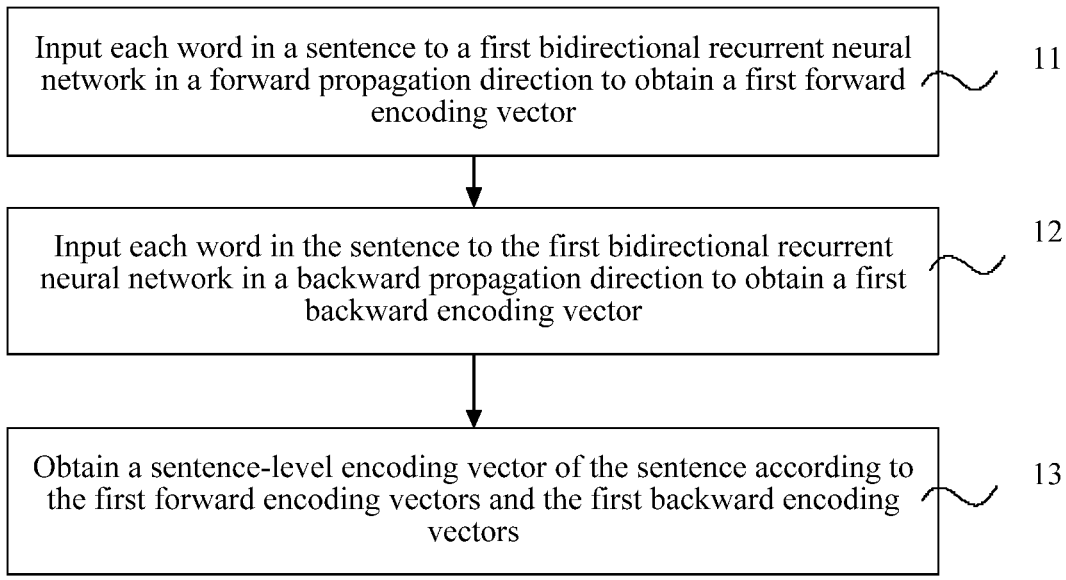

Using an example in which the sentence-level encoding vector of each sentence is calculated by using the bidirectional recurrent neural network, the step may include three steps, as shown in FIG. 2b. As one step (11), input each word in a sentence in the document D to a first bidirectional recurrent neural network in a forward propagation direction, to obtain a first forward encoding vector. As another step (12), input each word in the sentence in the document D to the first bidirectional recurrent neural network in a backward propagation direction, to obtain a first backward encoding vector. As yet another step (13), obtain a sentence-level encoding vector of the sentence according to the first forward encoding vectors and the first backward encoding vectors.

Optionally, for step 11, if a single sentence={$w_1$, $w_2$, $w_3$, ..., $w_t$}, $w_i$ represents an $i^{th}$ word in the sentence, and the first bidirectional recurrent neural network is an RNN.

Each word in the sentence is input to the RNN in the forward propagation direction, and the following calculation formula is used:

$$Sh^f_i = RNN(Sh^f_{i-1}, w_i),$$

where $Sh^f_i$ is an encoding result after the $i^{th}$ word in the sentence is input to the RNN in the forward propagation direction, $Sh^f_{i-1}$ is an encoding result after an $(i-1)^{th}$ word in the sentence is input to the RNN in the forward propagation direction, $w_i$ is the $i^{th}$ word in the sentence, and RNN is the first bidirectional recurrent neural network, where i is a positive integer, and when i-1=0, the $(i-1)^{th}$ word takes a null value or a default value.

In other words, a word-level encoding result of the $(i-1)^{th}$ word and the $i^{th}$ word in the sentence are input to the first bidirectional recurrent neural network to obtain a word-level encoding result of the $i^{th}$ word, where an encoding result obtained after a $t^{th}$ word is input to RNN is the first forward encoding vector of the sentence, and t is a quantity of words in the sentence.

Optionally, for step 12, each word in the sentence is input to RNN in the backward propagation direction, and the following calculation formula is used:

$$Sh^b_i = RNN(Sh^b_{i+1}, w_i),$$

where $Sh^b_i$ is an encoding result after the $i^{th}$ word in the sentence is input to RNN in the backward propagation direction, $Sh^b_{i+1}$ is an encoding result after an $(i+1)^{th}$ word in the sentence is input to RNN in the backward propagation direction, $w_i$ is the $i^{th}$ word in the sentence, and RNN is the first bidirectional recurrent neural network.

In other words, a word-level encoding result of the $(i+1)^{th}$ word and the $i^{th}$ word in the sentence are input to the first bidirectional recurrent neural network to obtain a word-level encoding result of the $i^{th}$ word, where the encoding result obtained after the first word is input to RNN is the first backward encoding vector of the sentence.

Optionally, step 11 and step 12 need to be performed on each sentence in the document D.

Optionally, for step 13, the following calculation formula is used:

$$S_i = [Sh^f_{it}, Sh^b_{i1}],$$

where $Sh^f_{it}$ is the first forward encoding vector obtained after a $t^{th}$ word in an $i^{th}$ sentence (the last word) is input to RNN in the forward propagation direction, t is a quantity of words in the sentence, $Sh^b_{i1}$ is the first backward encoding vector obtained after the first word in the $i^{th}$ sentence is input to RNN in the backward propagation direction, and $S_i$ is the sentence-level encoding vector of the $i^{th}$ sentence.

In step 102b, a document-level encoding vector of the document D is calculated according to the sentence-level encoding vector of each sentence.

Optionally, the document-level encoding vector may be calculated by using the bidirectional recurrent neural network or the unidirectional recurrent neural network. However, other calculation platforms may be used.

Figure 2C:
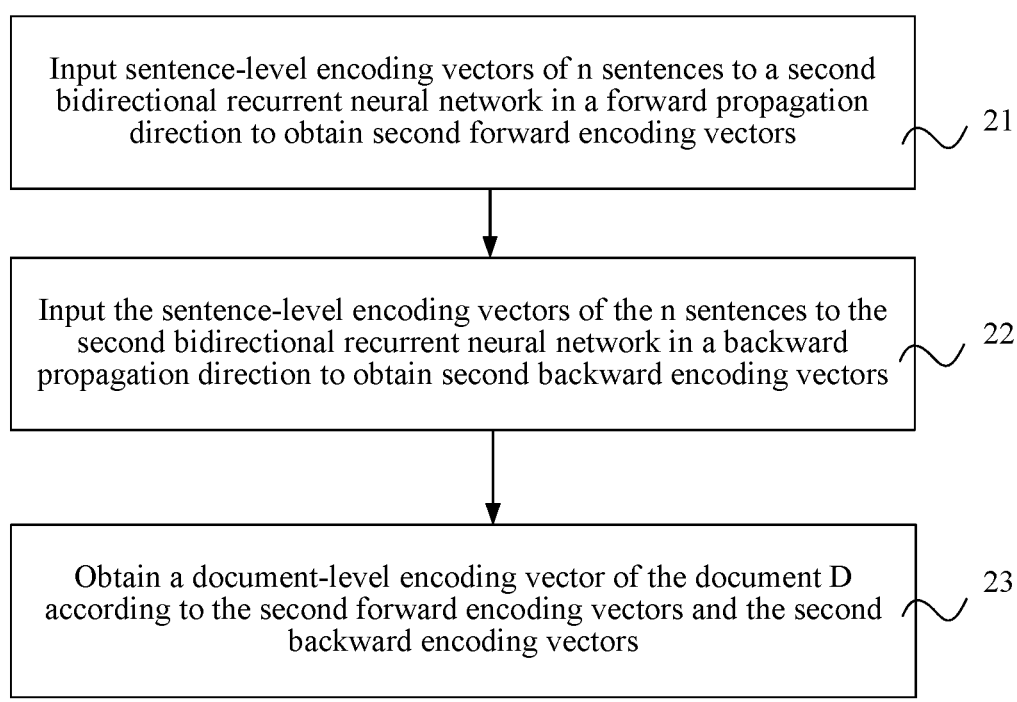

Using an example in which the document-level encoding vector is calculated by using the bidirectional recurrent neural network, the step may include three steps, as shown in FIG. 2c.

As one step (21), input sentence-level encoding vectors of n sentences to a second bidirectional recurrent neural network in a forward propagation direction, to obtain a second forward encoding vector, where n is a quantity of sentences in the document.

As another step (22), input sentence-level encoding vectors of the n sentences to the second bidirectional recurrent neural network in a backward propagation direction, to obtain a second backward encoding vector As yet another step (23), obtain a document-level encoding vector of the document D according to the second forward encoding vectors and the second backward encoding vectors.

Optionally, for step 21, the second bidirectional recurrent neural network is RNN, and the following calculation formula is used:

$$h^f_i = RNN(h^f_{i-1}, S_i),$$

where $h^f_i$ is an encoding result obtained after an $i^{th}$ sentence in the document D is input to RNN in the forward propagation direction, $h^f_{i-1}$ is an encoding result obtained after an $(i-1)^{th}$ sentence in the document D is input to RNN in the forward propagation direction, and $S_i$ is a sentence-level encoding vector of the $i^{th}$ sentence.

Optionally, for step 22, the second bidirectional recurrent neural network is RNN, and the following calculation formula is used:

$$h^b_i = RNN(h^b_{i+1}, S_i),$$

where $h^b_i$ is an encoding result obtained after an $i^{th}$ sentence in the document D is input to RNN in the backward propagation direction, $h^b_{i+1}$ is an encoding result obtained after an $(i+1)^{th}$ sentence in the document D is input to RNN in the forward propagation direction, and $S_i$ is a sentence-level encoding vector of the $i^{th}$ sentence.

Optionally, for step 23, the following calculation formula is used:

$$h_i = [h^f_i, h^b_i],$$

where $h^f_i$ is a second forward encoding vector of an $i^{th}$ sentence, $h^b_i$ is a second backward encoding vector of the $i^{th}$ sentence, and $h_i$ refers to any sentence in the document D.

In step 102c, a probability P of each sentence in the document is calculated according to the sentence-level encoding vector and the document-level encoding vector.

Optionally, the extractive model includes an attention-based model.

The attention-based model is used for calculating a probability value of each sentence according to the sentence-level encoding vector of each sentence and the document-level encoding vector.

The calculation formula is as follows:

$$P(S_i=1|D) = \sigma(a(S_i, h_i)),$$

where $S_i$ is a sentence-level encoding vector of an $i^{th}$ sentence in the document D, $h_i$ is a document-level encoding vector of the document D, a is a preset feedforward neural network, $\sigma$ is a preset first non-linear function, and $p(S_i=1|D)$ represents that the $i^{th}$ sentence is marked as 1 and extracted when a probability of the $i^{th}$ sentence is greater than the preset threshold and that the $i^{th}$ sentence is marked as 0 and discarded when a probability of the $i^{th}$ sentence is less than the preset threshold.

In step 102d, sentences whose probabilities P are greater than a preset threshold in the document D are extracted as the m candidate sentences.

In this and other embodiments, the m candidate sentences suitable for constituting the summary are extracted from the document D by using the attention-based model, so that inconspicuous and useless sentences in the document D are discarded. Thereby the system reduces noises in the sequence of the text that is input to the abstractive model, increasing the amount of information of the target words that are generated or extracted by using the abstractive model, ensuring that the generated summary meets an expected result, and further improving readability of the finally generated summary.

Figure 3A:
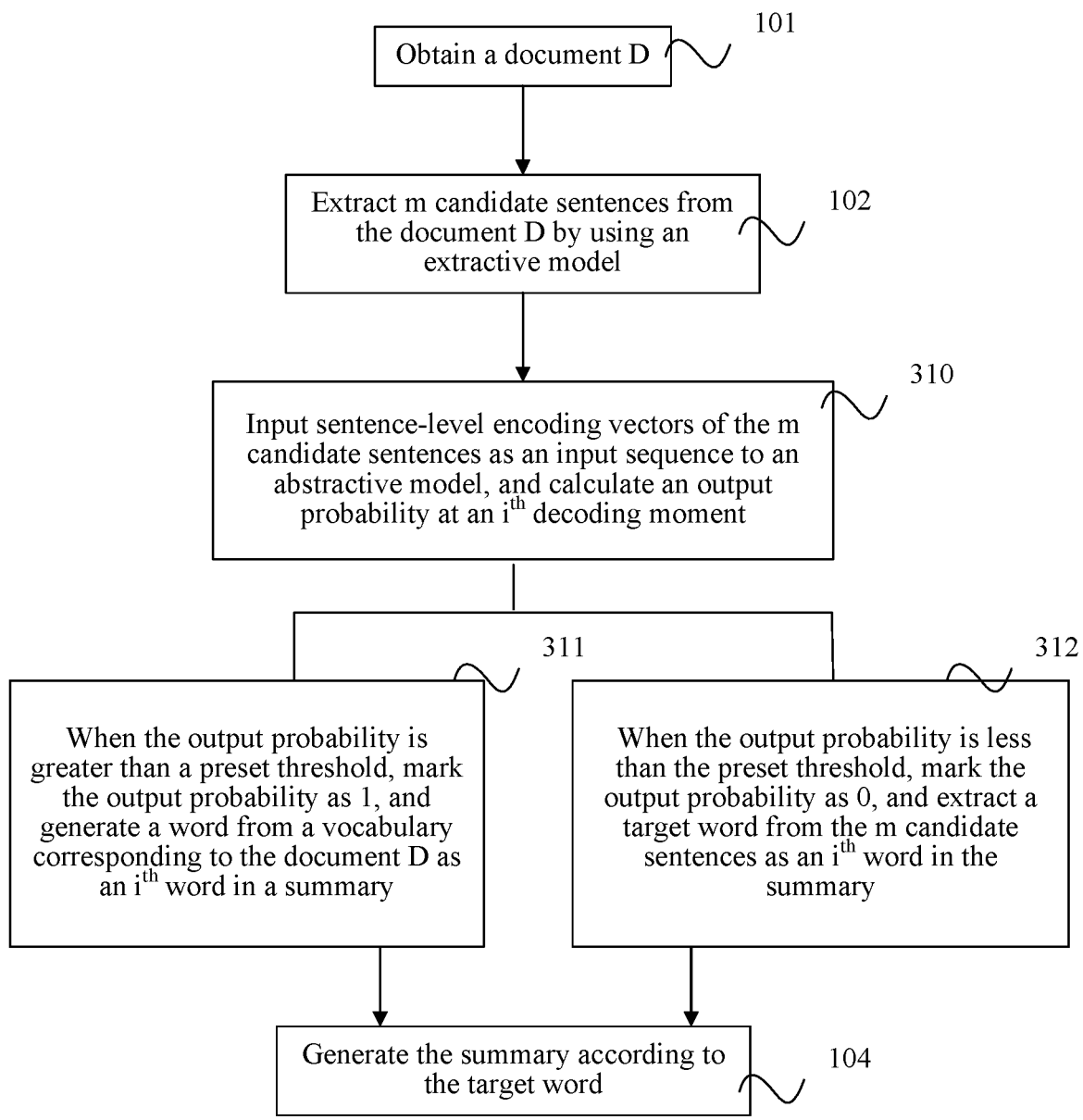
FIG. 3a to FIG. 3c are flowcharts of a summary generation method according to another example embodiment.

In some embodiments, the abstractive model is based on a pointer-generator network and includes an encoder and a decoder, where the decoder includes the pointer-generator network. The abstractive model calculates a context vector at the $i^{th}$ decoding moment according to the sentence-level encoding vectors of the m candidate sentences, obtains an implicit state at the $i^{th}$ decoding moment, and outputs an $i^{th}$ word in the summary according to the implicit state at the $i^{th}$ decoding moment. Specifically, based on the flowchart of the summary generation method shown in FIG. 1, step 103 can be alternatively implemented as step 310 to step 312, as shown in FIG. 3a:

In step 310, the sentence-level encoding vectors of the m candidate sentences are input as an input sequence to the abstractive model, and an output probability at an $i^{th}$ decoding moment is calculated.

Figure 3B:
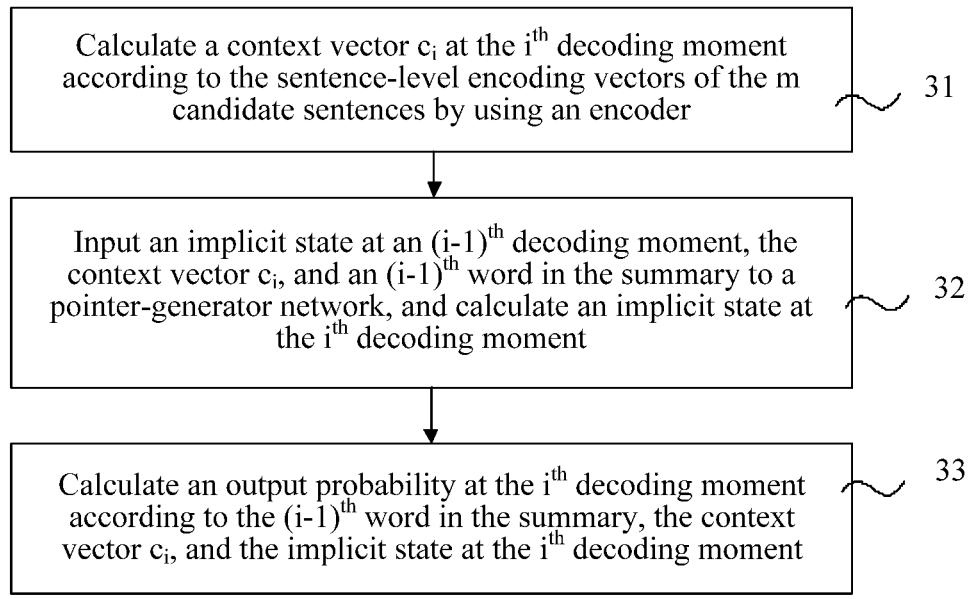

The output probability at the $i^{th}$ decoding moment is calculated through the following steps, as shown in FIG. 3b:

As one step (31), calculate a context vector $c_i$ at the $i^{th}$ decoding moment according to the sentence-level encoding vectors of the m candidate sentences by using the encoder.

As another step (32), input an implicit state at an $(i-1)^{th}$ decoding moment, the context vector $c_i$, and an $(i-1)^{th}$ word in the summary to the pointer-generator network, and calculate an implicit state at the $i^{th}$ decoding moment, where i is a positive integer, the implicit state at the $(i-1)^{th}$ decoding moment has a default value when i−1=0, and the default value may be all initialized to 0;

As yet another step (33), calculate the output probability at the $i^{th}$ decoding moment according to the $(i-1)^{th}$ word in the summary, the context vector $c_i$, and the implicit state at the $i^{th}$ decoding moment.

Optionally, for step 31, the following formula is used for calculation:

$$e_{ij} = a(h'_{i-1}, h_j)$$

$$\alpha_{ij} = \frac{\exp(e_{ij})}{\sum_{j=2}^{T} \exp(e_{ij})}$$

$$c_i = \sum_{j=1}^{T} \alpha_{ij} h_j$$

where $\alpha_{ij}$ is a weight value of the decoder at the $i^{th}$ decoding moment, $h_j$ represents an implicit state of the encoder at a $j^{th}$ encoding moment, $h'_{i-1}$ represents the implicit state at the $(i-1)^{th}$ decoding moment, T represents an input length of the input sequence, and a represents a preset feedforward neural network. The implicit state of the decoder at the $(i-1)^{th}$ decoding moment is a part of the input sequence that is already processed by the decoder at the $(i-1)^{th}$ decoding moment, and the implicit state of the encoder at the $j^{th}$ encoding moment is a part of the input sequence that is already processed by the encoder at the $j^{th}$ encoding moment.

The implicit state of the decoder at the $(i-1)^{th}$ decoding moment and the implicit state of the encoder at the $j^{th}$ encoding moment are input to the preset feedforward neural network, to obtain an output value. The weight value of the decoder at the $i^{th}$ decoding moment is calculated according to the output value. The output probability of the $i^{th}$ decoding moment is calculated according to the weight value of the decoder at the $i^{th}$ decoding moment and the implicit state of the encoder at the $j^{th}$ encoding moment.

Optionally, for step 32, the following formula is used for calculation:

$$h'_i = \text{RNN}(h'_{i-1}, c_i, y_{i-1})$$

where $h'_i$ is the implicit state of the decoder at the $i^{th}$ decoding moment, $h'_{i-1}$ is the implicit state of the decoder at the $(i-1)^{th}$ decoding moment, $c_i$ is the context vector, $y_{i-1}$ is an $(i-1)^{th}$ word in the summary, and RNN is a preset pointer-generator network.

Optionally, for step 33, the following formula is used for calculation:

$$p(G=1|D) = \sigma(h'_i, c_i, y_{i-1})$$

where $h'_i$ is the implicit state of the decoder at the $i^{th}$ decoding moment, $c_i$ is the context vector, $y_{i-1}$ is an $(i-1)^{th}$ word in the summary, and σ is a preset second non-linear function.

In step 311, when the output probability is greater than the preset threshold, the output probability is marked as 1, and a word is generated from a vocabulary that corresponds to the document D as an $i^{th}$ word in the summary.

Optionally, the vocabulary includes the top s most frequently occurring words in the document D, where s is a positive integer.

In step 312, when the output probability is less than the preset threshold, the output probability is marked as 0, and a target word is extracted from a target sentence in the m candidate sentences as an $i^{th}$ word in the summary.

Figure 3C:
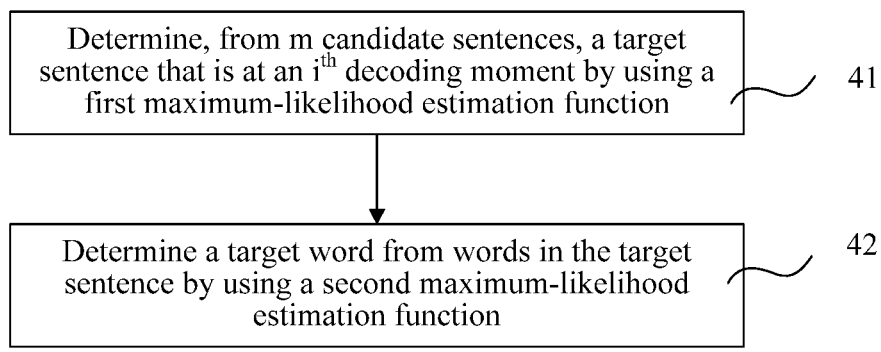

The target sentence and the target word may be extracted by using an attention-based model. Optionally, this step includes the following steps, as shown in FIG. 3c:

As one step (41), determine, from m candidate sentences, a target sentence that is at the $i^{th}$ decoding moment by using a first maximum-likelihood estimation function.

The following calculation formula is used:

$$p_{ij} = \text{argmax}(e_{ij})$$

where $P_{ij}$ is an optimal solution of the first maximum-likelihood estimation function for the m candidate sentences at the $i^{th}$ decoding moment. A calculation formula of $e_{ij}$ is as shown in step 31.

As another step (42), determine a target word from a target sentence by using a second maximum-likelihood estimation function.

The calculation formula as follows:

$$p_{ijk} = \text{argmax}(e_{ijk})$$

where $P_{ij}$ is an optimal solution of the second maximum-likelihood estimation function for each word in the target sentence at the $i^{th}$ decoding moment. A calculation formula of $e_{ijk}$ is shown as follows:

$$e_{ijk} = a(h'_{i-1}, sh_{jk})$$

where $h'_{i-1}$ represents the implicit state at the $(i-1)^{th}$ decoding moment, a represents a preset feedforward neural network, and $sh_{jk}$ represents an encoding result of a $k^{th}$ word in the target sentence in the first bidirectional recurrent neural network.

Optionally, the first maximum-likelihood estimation function and the second maximum-likelihood estimation function are functions determined based on the attention mechanism.

Based on the above, in this and other embodiments, the m candidate sentences suitable for constituting the summary are extracted from the document D by using the extractive model. Then, the target words are generated or extracted according to the candidate sentences by using the abstractive model. The abstractive model uses the feedforward neural network to weight an implicit state of each encoding moment, so that a context vector outputted by an encoder is more suitably used as the background when the target words are selected at the current encoding moment.

In this and other embodiments, more appropriate target words are selected by using the first maximum-likelihood estimation function and the second maximum-likelihood estimation function based on attention during the decoding process, to improve accuracy of the target words generated or extracted by using the abstractive model, ensure that the generated summary meets an expected result, and further increase readability and an amount of information of the finally generated summary.

In a specific example, a summary generation method provided in various embodiments is described with reference to FIG. 4 and FIG. 5.

In step 301, a document D is obtained, the document D including six sentences, and the third sentence including at least four words: w1, w2, w3, and w4.

Figure 4:
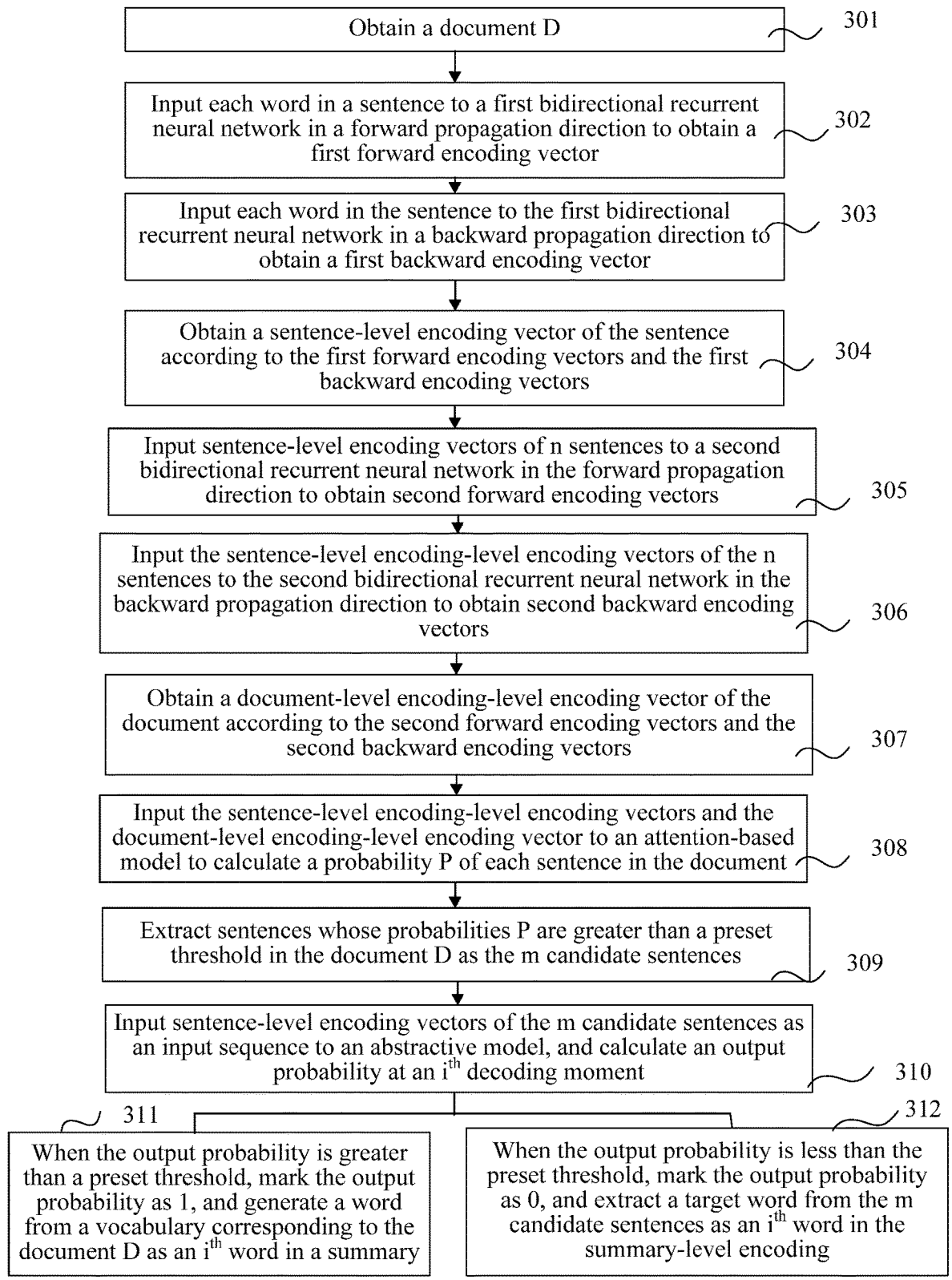
FIG. 4 is a flowchart of a summary generation method according to another example embodiment n.
Figure 5:
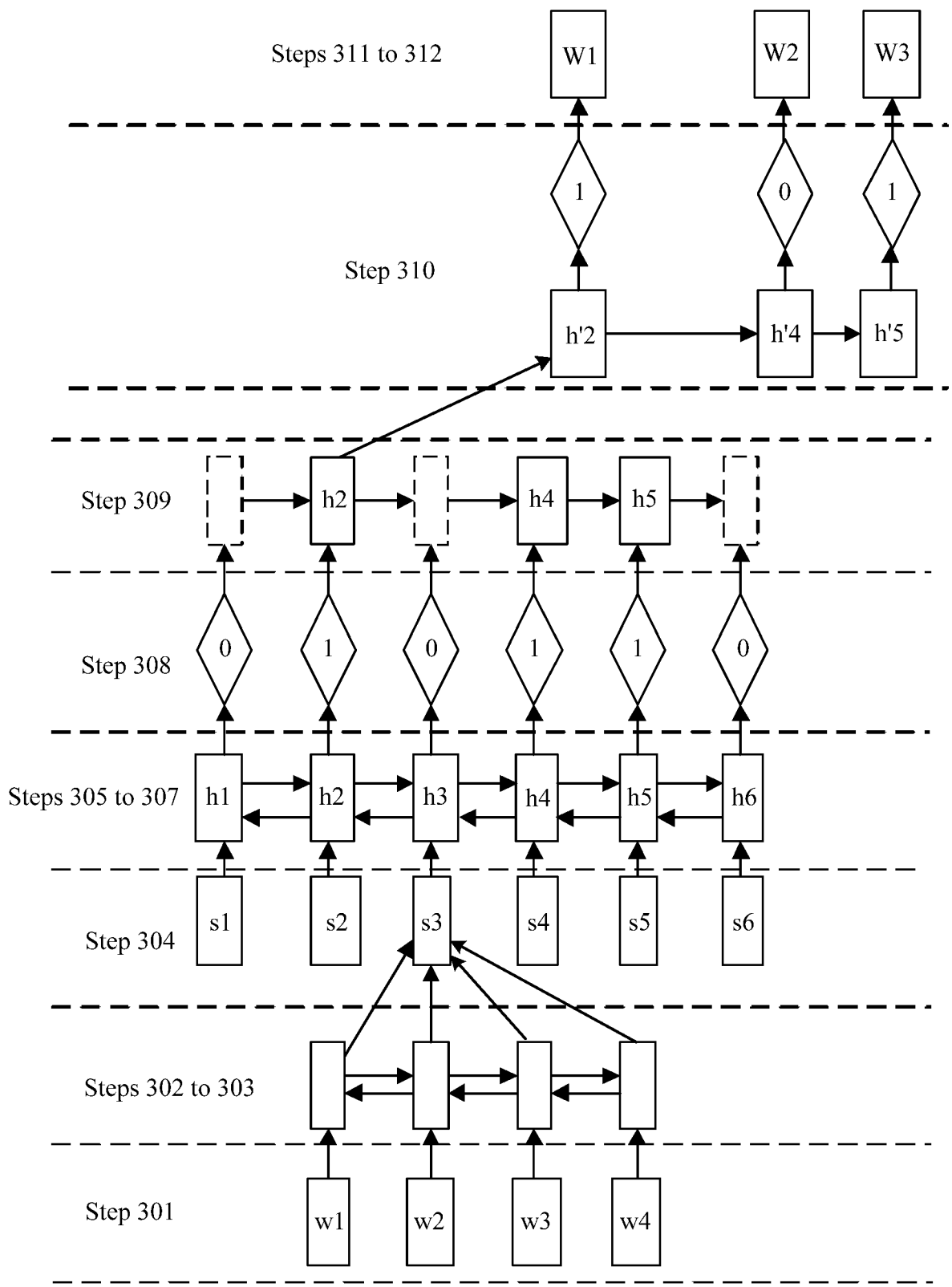
FIG. 5 is a flowchart of a summary generation method according to another example embodiment.

In step 302 and step 303, as shown by pointers in FIG. 4, each word in each sentence in the document D is input to a first bidirectional recurrent neural network in a forward propagation direction to obtain a first forward encoding vector. Each word in each sentence is input to the first bidirectional recurrent neural network in a backward propagation direction to obtain a first backward encoding vector.

In step 304, sentence-level encoding vectors s1 to s6 are obtained according to the first forward encoding vectors and the first backward encoding vectors.

In step 305 to step 307, sentence-level encoding vectors of the six sentences are input to a second bidirectional recurrent neural network in a forward propagation direction to obtain second forward encoding vectors. Sentence-level encoding vectors of the six sentences are input to the second bidirectional recurrent neural network in a backward propagation direction to obtain second backward encoding vectors. Document-level encoding vectors h1 to h6 of the document D are obtained according to the second forward encoding vectors and the second backward encoding vectors.

In step 308, the sentence-level encoding vector and the document-level encoding vector are input to an attention-based model, and a probability P of each sentence in the document is calculated.

Probabilities p of the second, the fourth, and the fifth sentence are greater than a preset threshold, and are marked as 1, and probabilities p of the first, the third, and the sixth sentence are less than the preset threshold, and are marked as 0.

In step 309, sentences whose probabilities p are greater than the preset threshold in the document D are extracted as the candidate sentences, to be specific, the second, the fourth, and the fifth sentences are extracted as the candidate sentences h'2, h'4, and h'5.

In step 310, the sentence-level encoding vectors of the candidate sentences are input as an input sequence to the abstractive model, and an output probability at an $i^{th}$ decoding moment is calculated.

As shown in FIG. 4, an output probability of h'2 at the $i^{th}$ decoding moment is greater than the preset threshold and is marked as 1, an output probability of h'4 at an $(i+k)^{th}$ decoding moment is less than the preset threshold and is marked as 0, and an output probability of h'5 at an $(i+1)^{th}$ decoding moment is greater than the preset threshold and is marked as 1. The $i^{th}$ decoding moment, the $(i+k)^{th}$ decoding moment, and the $(i+1)^{th}$ decoding moment are three different decoding moments, and both k and 1 are integers.

In step 311, when the output probability is greater than the preset threshold, a word from a vocabulary that corresponds to the document D is generated as a word in the summary. In some cases, w1 and w3 are the words generated from the vocabulary.

In step 312, when the output probability is less than the preset threshold, the target word is extracted from the target sentence in the candidate sentences and used as the word in the summary. In some cases, w2 is the word extracted from the second sentence of the target sentence.

Figure 6:
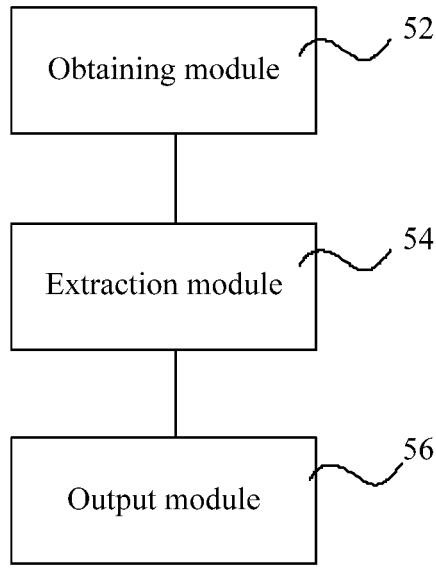
FIG. 6 is a flowchart of a summary generation apparatus according to an example embodiment.

FIG. 6 is a block diagram of a summary generation apparatus according to an example embodiment. The apparatus may be implemented as a computer device or a part of a computer device by using software, hardware, or a combination thereof. The apparatus includes an obtaining module 52, an extraction module 54, and an output module 56.

The obtaining module 52 is configured to obtain a document D, the document including at least one sentence, and each sentence including at least one word.

The extraction module 54 is configured to extract m candidate sentences from the document D by using an extractive model.

The output module 56 is configured to output target words according to the m candidate sentences by using an abstractive model, and generate a summary according to the target words.

In some embodiments, the extraction module includes a calculation unit, configured to calculate a sentence-level encoding vector of each sentence in the document. The calculation unit is further configured to calculate a document-level encoding vector of the document according to the sentence-level encoding vector of each sentence. The calculation unit is further configured to calculate a probability P of each sentence in the document according to the sentence-level encoding vector and the document-level encoding vector, and extract sentences whose probabilities P are greater than a preset threshold in the document as the m candidate sentences, where a value of the probability P of each sentence is 1 or 0.

In some embodiments, the calculation unit includes a first input subunit, configured to input each word in the sentence to a first bidirectional recurrent neural network in a forward propagation direction, to obtain a first forward encoding vector. The first input subunit is further configured to input each word in the sentence to the first bidirectional recurrent neural network in a backward propagation direction, to obtain a first backward encoding vector. The first input subunit is further configured to obtain the sentence-level encoding vector of the sentence according to the first forward encoding vectors and the first backward encoding vectors.

In some embodiments, the input subunit is further configured to input sentence-level encoding vectors of n sentences to a second bidirectional recurrent neural network in a forward propagation direction, to obtain second forward encoding vectors, where n is a quantity of sentences in the document. The first input subunit is further configured to input sentence-level encoding vectors of the n sentences to the second bidirectional recurrent neural network in a backward propagation direction, to obtain second backward encoding vectors. The first input subunit is further configured to obtain the document-level encoding vector of the document D according to the second forward encoding vectors and the second backward encoding vectors.

In some embodiments, the output module includes an input submodule, configured to: input sentence-level encoding vectors of the m candidate sentences as an input sequence to the abstractive model, and calculate an output probability at an $i^{th}$ decoding moment, where i is a positive integer;

The output module may further include a generation submodule, further configured to: when the output probability is greater than the preset threshold, generate, as an $i^{th}$ word in the summary, a word from a vocabulary corresponding to the document, where the vocabulary includes words whose occurrence frequencies is higher than a preset criterion in the document; and The output module may further include an extraction module, further configured to: when the output probability is less than the preset threshold, extract a target word from a target sentence in the m candidate sentences, and use the target word as an $i^{th}$ word in the summary.

In some embodiments, the input module further includes a calculation subunit, configured to calculate a context vector $c_i$ at the $i^{th}$ decoding moment according to the sentence-level encoding vectors of the m candidate sentences by using the encoder; and The input module may further include a second input subunit, further configured to: input an implicit state at an $(i-1)^{th}$ decoding moment, the context vector $c_i$, and an $(i-1)^{th}$ word in the summary to the decoder, and calculate an implicit state at the $i^{th}$ decoding moment, where the implicit state at the $i^{th}$ decoding moment is used for indicating a part of the input sequence that is already processed by the decoder at the $i^{th}$ decoding moment.

The calculation subunit is further configured to: calculate the output probability at the $i^{th}$ decoding moment according to the $(i-1)^{th}$ word in the summary, the context vector $c_i$, and the implicit state at the $i^{th}$ decoding moment, where i is a positive integer, and when i−1=0, the implicit state at the $(i-1)^{th}$ decoding moment has a default value, and the $(i-1)^{th}$ word has a default value.

In some embodiments, the calculation subunit is further configured to calculate the context vector $c_i$ in accordance with the following formula:

$$c_i = \sum_{j=1}^{T} \alpha_{ij} h_j$$

$$\alpha_{ij} = \frac{\exp(e_{ij})}{\sum_{j=2}^{T} \exp(e_{ij})}$$

$$e_{ij} = a(h'_{i-1}, h_j)$$

where $h_j$ represents an implicit state at a $j^{th}$ encoding moment, T represents a length of the input sequence, $h'_{i-1}$ represents an implicit state at an $(i-1)^{th}$ decoding moment, and a represents a preset feedforward neural network, where the implicit state at the encoding moment is used for indicating a part of the input sequence that is already processed by the encoder at the current encoding moment.

In some embodiments, the output module further includes a sentence submodule, configured to determine, from the m candidate sentences, a target sentence that is at the $i^{th}$ decoding moment by using a first maximum-likelihood estimation function.

The output module may further include a word submodule, configured to determine a target word from words in the target sentence by using a second maximum-likelihood estimation function.

The modules and subunits discussed above may be implemented on circuitry and/or circuits. The circuitry and/or circuits may include hardware processors. The circuitry and/or circuits may further include memory operative to store instructions executed by the processor to perform the operations describe above with reference to the modules and subunits.

Figure 7:
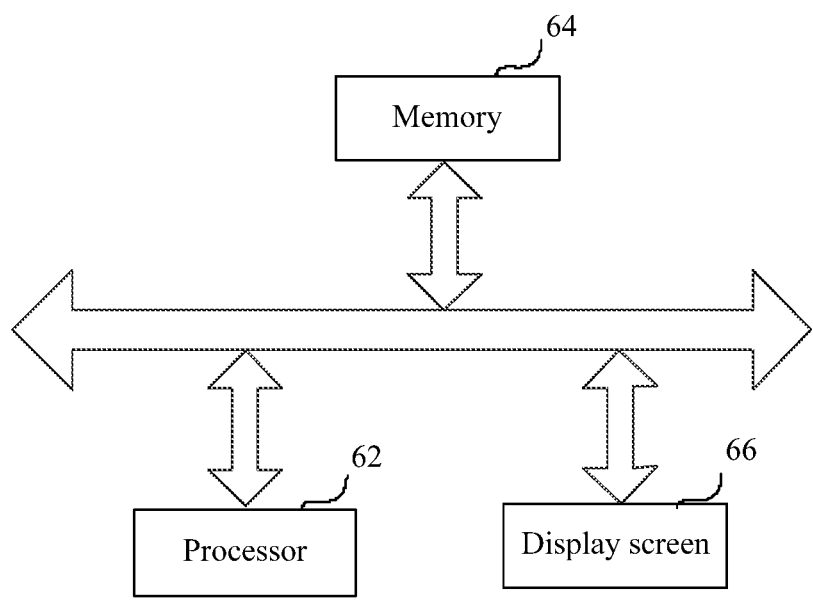
FIG. 7 is a block diagram of a computer device according to an example embodiment.

FIG. 7 is a block diagram of a computer device according to an example embodiment. The computer device may be a mobile phone, a tablet computer, a portable laptop computer, a desktop computer, a server, and or other processing device. The computer device includes a processor 62 and a memory 64. Optionally, the computer device further includes a display screen 66.

The processor 62 may be at least one of a single-core processor, a multi-core processor, an embedded chip, and processors having computing capability.

The memory 64 stores an instruction executable by the processor. For example, the memory 64 is a computer-readable storage medium, which may be non-transitory. The computer-readable storage medium stores at least one instruction, at least one program, a code set, or an instruction set. The at least one instruction, the at least one program, the code set, or the instruction set is loaded and executed by the processor 62 to perform any one of the summary generation methods shown in FIG. 1 to FIG. 5.

Optionally, the display screen 66 is used for the computer device to display content of the document D and content of an automatic text summary generated according to the content of the document D.

Optionally, various embodiments further provides a computer-readable storage medium. The storage medium is a computer-readable storage medium. The storage medium stores at least one instruction, at least one program, a code set, or an instruction set. The at least one instruction, the at least one program, the code set, or the instruction set is loaded and executed by a processor to implement any one of the summary generation methods shown in FIG. 1 to FIG. 5. Optionally, the computer-readable storage medium includes a cache and a non-volatile memory.

The sequence numbers of the preceding embodiments are for descriptive purposes and do not indicate any preference among the embodiments.

Some of the steps of the foregoing embodiments may be implemented by using hardware, or may be implemented by a program instructing relevant hardware. The program may be stored in a storage medium. The above-mentioned storage medium may be a read-only memory, a magnetic disk, an optical disc, or the like.

The above descriptions are illustrative embodiments, but are not intended to be limiting. Any modification, equivalent replacement, or improvement made without departing from the spirit and principle of the techniques and architectures discussed herein.

What is claimed is:

1. A summary generation method, performed by a computer device, and the method comprising:
    obtaining a document, the document comprising at least one sentence;

extracting m candidate sentences from the document by using an extractive model by:
  calculating a sentence-level encoding vector of each sentence in the document; and
  calculating a document-level encoding vector of the document according to the sentence-level encoding vector of each sentence; and
  calculating, by an attention-based model, a probability P of each sentence in the document according to the sentence-level encoding vector and the document-level encoding vector, and extracting sentences whose probabilities P are greater than a preset threshold in the document as the m candidate sentences; and
outputting target words according to the m candidate sentences by using an abstractive model, and generating a summary according to the target words.

2. The method according to claim 1, wherein the extractive model comprises a first bidirectional recurrent neural network; and
  the calculating a sentence-level encoding vector of each sentence in the document comprises:
  inputting each word in the sentence to the first bidirectional recurrent neural network in a forward propagation direction, to obtain a first forward encoding vector;
  inputting each word in the sentence to the first bidirectional recurrent neural network in a backward propagation direction, to obtain a first backward encoding vector; and
  obtaining the sentence-level encoding vector of the sentence according to the first forward encoding vectors and the first backward encoding vectors.

3. The method according to claim 1, wherein the extractive model comprises a second bidirectional recurrent neural network; and
  the calculating a document-level encoding vector of the document according to the sentence-level encoding vector of each sentence comprises:
  inputting sentence-level encoding vectors of n sentences to the second bidirectional recurrent neural network in a forward propagation direction, to obtain second forward encoding vectors, wherein n is a quantity of sentences in the document;
  inputting the sentence-level encoding vectors of the n sentences to the second bidirectional recurrent neural network in a backward propagation direction, to obtain second backward encoding vectors; and
  obtaining the document-level encoding vector of the document according to the second forward encoding vectors and the second backward encoding vectors.

4. The method according to claim 1, wherein the extractive model comprises the attention-based model, wherein the attention-based model is:

$p(S_i=1|D)=\sigma(a(S_i,h_i))$, wherein

D is the document, $S_i$ is a sentence-level encoding vector of an $i^{th}$ sentence in the document D, $h_i$ is a document-level encoding vector of the document D, a is a preset feedforward neural network, σ is a preset first nonlinear function, and $p(S_i=1|D)$ represents that the $i^{th}$ sentence is marked as 1 and extracted when a probability of the $i^{th}$ sentence is greater than the preset threshold, wherein i is a positive integer.

5. The method according to claim 1, wherein the outputting target words according to the m candidate sentences by using an abstractive model, and generating a summary according to the target words comprises:

inputting sentence-level encoding vectors of the m candidate sentences as an input sequence to the abstractive model, and calculating an output probability at an $i^{th}$ decoding moment, wherein i is a positive integer; and
when the output probability is greater than the preset threshold, generating, as an $i^{th}$ word in the summary, a word from a vocabulary that corresponds to the document, wherein the vocabulary comprises words whose occurrence frequencies are higher than a preset criterion in the document; or
when the output probability is less than the preset threshold, extracting a target word from a target sentence in the m candidate sentences, and using the target word as an $i^{th}$ word in the summary.

6. The method according to claim 5, wherein the abstractive model comprises an encoder and a decoder; and
  the inputting the sentence-level encoding vectors of the m candidate sentences as an input sequence to the abstractive model, and calculating an output probability at an $i^{th}$ decoding moment comprises:
  calculating a context vector $c_i$ at the $i^{th}$ decoding moment according to the sentence-level encoding vectors of the m candidate sentences by using the encoder;
  inputting an implicit state at an $(i-1)^{th}$ decoding moment, the context vector $c_i$, and an $(i-1)^{th}$ word in the summary to the decoder, and calculating an implicit state at the $i^{th}$ decoding moment, wherein the implicit state at the $i^{th}$ decoding moment is used for indicating a part of the input sequence that is already processed by the decoder at the $i^{th}$ decoding moment; and
  calculating the output probability at the $i^{th}$ decoding moment according to the $(i-1)^{th}$ word in the summary, the context vector $c_i$, and the implicit state at the $i^{th}$ decoding moment.

7. The method according to claim 5, wherein the abstractive model further comprises a first maximum-likelihood estimation function and a second maximum-likelihood estimation function; and
  the extracting a target word from a target sentence in the m candidate sentences, and using the target word as an $i^{th}$ word in the summary comprises:
  determining, from the m candidate sentences, a target sentence that is at the $i^{th}$ decoding moment by using the first maximum-likelihood estimation function; and
  determining a target word from words in the target sentence by using the second maximum-likelihood estimation function.

8. A summary generation apparatus, comprising a memory and a processor, the memory storing a computer-readable instruction, and the processor executing the computer-readable instruction in the memory, to perform the following steps:
  obtaining a document, the document comprising at least one sentence, and each sentence comprising at least one word;
  extracting m candidate sentences from the document by using an extractive model by:
    calculating a sentence-level encoding vector of each sentence in the document; and
    calculating a document-level encoding vector of the document according to the sentence-level encoding vector of each sentence; and
    calculating, by an attention-based model, a probability P of each sentence in the document according to the sentence-level encoding vector and the document-level encoding vector, and extracting sentences whose probabilities P are greater than a preset threshold in the document as the m candidate sentences; and outputting target words according to the m candidate sentences by using an abstractive model, and generating summary according to the target words.

9. The summary generation apparatus according to claim 8, wherein the extractive model comprises a first bidirectional recurrent neural network; and the calculating a sentence-level encoding vector of each sentence in the document comprises:

inputting each word in the sentence to the first bidirectional recurrent neural network in a forward propagation direction, to obtain a first forward encoding vector;

inputting each word in the sentence to the first bidirectional recurrent neural network in a backward propagation direction, to obtain a first backward encoding vector; and obtaining the sentence-level encoding vector of the sentence according to the first forward encoding vectors and the first backward encoding vectors.

10. The summary generation apparatus according to claim 8, wherein the extractive model comprises a second bidirectional recurrent neural network; and the calculating a document-level encoding vector of the document according to the sentence-level encoding vector of each sentence comprises:

inputting sentence-level encoding vectors of n sentences to the second bidirectional recurrent neural network in a forward propagation direction, to obtain second forward encoding vectors, wherein n is a quantity of sentences in the document;

inputting the sentence-level encoding vectors of the n sentences to the second bidirectional recurrent neural network in a backward propagation direction, to obtain second backward encoding vectors; and obtaining the document-level encoding vector of the document according to the second forward encoding vectors and the second backward encoding vectors.

11. A computer device, comprising a processor and a memory, the memory storing at least one instruction, at least one program, a code set, or an instruction set, and the at least one instruction, the at least one program, the code set, or the instruction set being loaded and executed by the processor to implement the summary generation by:

obtaining a document, the document comprising at least one sentence;

extracting m candidate sentences from the document by using an extractive model by:

calculating a sentence-level encoding vector of each sentence in the document; and calculating a document-level encoding vector of the document according to the sentence-level encoding vector of each sentence; and calculating, by an attention-based model, a probability P of each sentence in the document according to the sentence-level encoding vector and the document-level encoding vector, and extracting sentences whose probabilities P are greater than a preset threshold in the document as the m candidate sentences; and outputting target words according to the m candidate sentences by using an abstractive model, and generating a summary according to the target words.

12. The computing device according to claim 11, wherein the extractive model comprises a first bidirectional recurrent neural network; and the calculating a sentence-level encoding vector of each sentence in the document comprises:

inputting each word in the sentence to the first bidirectional recurrent neural network in a forward propagation direction, to obtain a first forward encoding vector;

inputting each word in the sentence to the first bidirectional recurrent neural network in a backward propagation direction, to obtain a first backward encoding vector; and obtaining the sentence-level encoding vector of the sentence according to the first forward encoding vectors and the first backward encoding vectors.

13. The computer device according to claim 11, wherein the extractive model comprises a second bidirectional recurrent neural network; and the calculating a document-level encoding vector of the document according to the sentence-level encoding vector of each sentence comprises:

inputting sentence-level encoding vectors of n sentences to the second bidirectional recurrent neural network in a forward propagation direction, to obtain second forward encoding vectors, wherein n is a quantity of sentences in the document;

inputting the sentence-level encoding vectors of the n sentences to the second bidirectional recurrent neural network in a backward propagation direction, to obtain second backward encoding vectors; and obtaining the document-level encoding vector of the document according to the second forward encoding vectors and the second backward encoding vectors.

14. The computer device according to claim 11, wherein the extractive model comprises the attention-based model, wherein the attention-based model is:

$p(S_i=1|D)=\sigma(a(S_i,h_i))$, wherein

D is the document, $S_i$ is a sentence-level encoding vector of an $i^{th}$ sentence in the document D, $h_i$ is a document-level encoding vector of the document D, a is a preset feedforward neural network, σ is a preset first non-linear function, and $p(S_i=1|D)$ represents that the $i^{th}$ sentence is marked as 1 and extracted when a probability of the $i^{th}$ sentence is greater than the preset threshold, wherein i is a positive integer.

15. The computer device according to claim 11, wherein the outputting target words according to the m candidate sentences by using an abstractive model, and generating a summary according to the target words comprises:

inputting sentence-level encoding vectors of the m candidate sentences as an input sequence to the abstractive model, and calculating an output probability at an $i^{th}$ decoding moment, wherein i is a positive integer; and when the output probability is greater than the preset threshold, generating, as an $i^{th}$ word in the summary, a word from a vocabulary that corresponds to the document, wherein the vocabulary comprises words whose occurrence frequencies are higher than a preset criterion in the document; or when the output probability is less than the preset threshold, extracting a target word from a target sentence in the m candidate sentences, and using the target word as an $i^{th}$ word in the summary.

16. The computer device according to claim 15, wherein the abstractive model comprises an encoder and a decoder; and the inputting the sentence-level encoding vectors of the m candidate sentences as an input sequence to the abstractive model, and calculating an output probability at an $i^{th}$ decoding moment comprises:

calculating a context vector $c_i$ at the $i^{th}$ decoding moment according to the sentence-level encoding vectors of the m candidate sentences by using the encoder;

inputting an implicit state at an $(i-1)^{th}$ decoding moment, the context vector $c_i$, and an $(i-1)^{th}$ word in the summary to the decoder, and calculating an implicit state at the $i^{th}$ decoding moment, wherein the implicit state at the $i^{th}$ decoding moment is used for indicating a part of the input sequence that is already processed by the decoder at the $i^{th}$ decoding moment; and calculating the output probability at the $i^{th}$ decoding moment according to the $(i-1)^{th}$ word in the summary, the context vector $c_i$, and the implicit state at the $i^{th}$ decoding moment.

17. The computer device according to claim 15, wherein the abstractive model further comprises a first maximum-likelihood estimation function and a second maximum-likelihood estimation function; and the extracting a target word from a target sentence in the m candidate sentences, and using the target word as an $i^{th}$ word in the summary comprises:

determining, from the m candidate sentences, a target sentence that is at the $i^{th}$ decoding moment by using the first maximum-likelihood estimation function; and determining a target word from words in the target sentence by using the second maximum-likelihood estimation function.

* * * * *